(12) United States Patent
Yuzurihara et al.

(10) Patent No.: US 9,621,064 B2
(45) Date of Patent: Apr. 11, 2017

(54) ARC QUENCHING CIRCUIT FOR A POWER SUPPLY IN A PLASMA GENERATOR

(71) Applicant: KYOSAN ELECTRIC MFG. CO., LTD., Yokohama-shi, Kanagawa (JP)

(72) Inventors: Itsuo Yuzurihara, Yokohama (JP); Shinichi Kodama, Yokohama (JP); Toshiyuki Adachi, Yokohama (JP)

(73) Assignee: KYOSAN ELECTRIC MFG. CO., LTD., Yokohama-shi (JP)

( * ) Notice: Subject to any disclaimer, the term of this patent is extended or adjusted under 35 U.S.C. 154(b) by 0 days.

(21) Appl. No.: 14/904,336

(22) PCT Filed: Dec. 26, 2013

(86) PCT No.: PCT/JP2013/084822
§ 371 (c)(1),
(2) Date: Jan. 11, 2016

(87) PCT Pub. No.: WO2015/045196
PCT Pub. Date: Apr. 2, 2015

(65) Prior Publication Data
US 2016/0141971 A1 May 19, 2016

(30) Foreign Application Priority Data

Sep. 27, 2013 (JP) ................. 2013-201952

(51) Int. Cl.
*H02M 3/158* (2006.01)
*H02M 5/458* (2006.01)
(Continued)

(52) U.S. Cl.
CPC ......... *H02M 5/458* (2013.01); *H02M 3/1582* (2013.01); *H02M 7/4807* (2013.01); *H02M 2001/007* (2013.01)

(58) Field of Classification Search
CPC ......... H02M 2001/007; H02M 3/1582; H02M 7/5387
See application file for complete search history.

(56) References Cited

U.S. PATENT DOCUMENTS 4,544,807 A * 10/1985 Sers ................. H04M 3/30
379/21
4,734,061 A * 3/1988 Randall, Jr. ........ H01R 13/5216
439/271
(Continued)

FOREIGN PATENT DOCUMENTS

JP   10-298754 A   11/1998
JP   2001-335928 A   12/2001
(Continued)

OTHER PUBLICATIONS

IEEE Guide for Automatic Reclosing of Circuit Breakers for AC Distribution and Transmission Lines, in IEEE Std C37.104-2012 (Revision of IEEE Std C37.104-2002), vol., No., pp. 1-72, Jul. 6, 2012.*

(Continued)

*Primary Examiner* — Harry Behm
*Assistant Examiner* — Peter Novak
(74) *Attorney, Agent, or Firm* — Westerman, Hattori, Daniels & Adrian, LLP (57) ABSTRACT

In a voltage-type DC power supply provided with an inverter, current supply from the inverter to the load side is suppressed when arc is generated. DC output from the voltage-type DC power supply is suspended and resumed: upon suspending the DC output, the chopper is separated from the inverter, thereby suppressing excessive current to the load when arc is generated, allowing the arc to be extinguished at high speed, and holding the current passing through the chopper in the form of circulating current. Upon restarting the inverter, the circulating current being held is (Continued)

supplied to the load, thereby reducing a delay of supply of DC power to the load at the time of resuming the DC output from the voltage-type DC power supply.

4 Claims, 8 Drawing Sheets (51) Int. Cl.
*H02M 7/48* (2007.01)
*H02M 1/00* (2006.01)

(56) References Cited

U.S. PATENT DOCUMENTS

| | | | | |
|---|---|---|---|---|
| 5,245,202 | A * | 9/1993 | Yasukazu | H01L 29/7395 257/133 |
| 6,113,760 | A | 9/2000 | Kuriyama et al. | |
| 2001/0042769 | A1 * | 11/2001 | Hohner | B27F 7/23 227/82 |
| 2004/0004848 | A1 | 1/2004 | Yuzurihara et al. | |
| 2004/0055881 | A1 | 3/2004 | Christie | |
| 2005/0047035 | A1 * | 3/2005 | Vallinmaki | H02M 5/458 361/42 |
| 2006/0213761 | A1 | 9/2006 | Axenbeck et al. | |
| 2007/0188960 | A1 * | 8/2007 | Balakrishnan | H02H 3/06 361/93.4 |
| 2008/0239764 | A1 * | 10/2008 | Jacques | H02M 1/32 363/21.04 |
| 2010/0066337 | A1 * | 3/2010 | Gong | H02M 1/4225 323/285 |
| 2011/0120860 | A1 | 5/2011 | Horishita et al. | |
| 2014/0211530 | A1 * | 7/2014 | Chen | H02M 7/53871 363/132 |
| 2015/0180346 | A1 | 6/2015 | Yuzurihara et al. | |

FOREIGN PATENT DOCUMENTS

| | | |
|---|---|---|
| JP | 2004-40962 A | 2/2004 |
| JP | 2005-149761 A | 6/2005 |
| JP | 2006-6053 A | 1/2006 |
| JP | 2006-500473 A | 1/2006 |
| JP | 2006-278335 A | 10/2006 |
| JP | 2007-282419 A | 10/2007 |
| JP | 2009-284734 A | 12/2009 |
| JP | 5557407 B1 | 7/2014 |
| TW | 201014147 A | 4/2010 |
| WO | 2014/038013 A1 | 3/2014 |

OTHER PUBLICATIONS

J. Vico, M. Adamiak, C. Wester and A. Kulshrestha, "High impedance fault detection on rural electric distribution systems," Rural Electric Power Conference (REPC), 2010 IEEE, Orlando, FL, 2010, pp. B3-B3-8.*
International Search Report dated Apr. 8, 2014, issued in counterpart Application No. PCT/JP2013/084822 (2 pages).
Written Opinion dated Apr. 8, 2014, issued in counterpart Application No. PCT/JP2013/084822, w/English translation (11 pages).
Decision of Grant a Patent dated Dec. 24, 2014, issued in counterpart Japanese Patent Application No. 2013-201952, w/English translation (9 pages).

* cited by examiner

FIG. 5A
POWER SUPPLY TIME

FIG. 5B
ARCING TIME

FIG. 5C
HOLDING STATE

FIG. 5D
ARC EXTINGUISHING TIME

ARC QUENCHING CIRCUIT FOR A POWER SUPPLY IN A PLASMA GENERATOR

TECHNICAL FIELD

The present invention relates to a voltage-type DC power supply and a control method of the voltage-type DC power supply. By way of example, it relates to a voltage-type DC power supply used for a load such as a plasma generator, and a control method thereof.

BACKGROUND ART

It is required that a DC power supply used for a plasma generator should control excess current when an arc is generated, and extinguish the arc at a high speed. A voltage-type DC power supply has problems, including that a large capacitor connected to an output may cause an excess discharge current to pass, when an arc is generated, and in order to compensate for a drop of output voltage upon arc occurrence, the output is made to increase more, and this may result in an impact on the load, such as extension of the arcing time.

Some methods as the following are known for addressing arc discharge:
1) The power supply is suspended, and the operation is restarted after a lapse of a certain period of time;
2) An LC oscillation circuit made up of a combination of a reactance and a capacitor generates reverse voltage, thereby causing arc self-extinguishing; and
3) An reverse voltage generation circuit including a solid-state switching element generates reverse voltage, thereby causing arc self-extinguishing.

In the methods as described above, there are already found some problems, including a point that if the arc discharge frequently occurs, the output current may become uncontrollable, and a point that a temporal delay may occur for restarting normal discharge, and the like.

In order to solve the problems described above, a DC power supply for plasma is suggested to control the amount of power to be supplied to a plasma generator, by employing a current source inverter as an inverter and controlling a switching operation of the current source inverter as a current source (Patent Document 1).

PRIOR ART DOCUMENT

Patent Document

[Patent Document 1] Japanese Unexamined Patent Application Publication No. 2004-40962 (paragraph [0002] to paragraph [0027])

DISCLOSURE OF THE INVENTION

Problem to be Solved by the Invention

The DC power supply for plasma, being suggested in the Patent Document 1 is a current-type DC power supply that controls a switching operation of a current source inverter, thereby controlling the amount of supply to the plasma generator, and supplying stable DC power by the operation of the current source. In other words, power is controlled as a current source, not a voltage source, so as to achieve stable control.

Therefore, there is not known a voltage-type DC power supply that maintains the configuration of a voltage source without being changed to a current source, suppresses excess current when an arc is generated, and resumes supplying of DC output immediately after arc extinguishing.

The present invention solves such conventional problems as described above, and it is directed to a voltage-type DC power supply, aiming to suppressing a supply of excess current from the inverter to the load side when an arc is generated.

Means to Solve the Problem

In the case where DC power is supplied, assuming the plasma generator as a load, when an arc discharge occurs in the plasma generator being the load, supplying of DC power from the voltage-type DC power supply to the plasma generator is suspended, thereby suppressing excess current, and reducing damage to electrodes and substrates. In addition, when the arc is extinguished, supplying of the DC power is resumed from the voltage-type DC power supply to the plasma generator.

The voltage-type DC power supply of the present invention holds the direct current that passes through the voltage-type DC power supply when an arc is generated, and suppresses the supply to the load side. Then, when the supply of the direct current from the voltage-type DC power supply is resumed after the arc is extinguished, the supply of the DC output to the load is performed promptly, by using the direct current being held.

In suspending and resuming the DC output from the voltage-type DC power supply, a chopper is separated from an inverter when the suspension is performed, and excess current to the load upon arc generation is suppressed, thereby extinguishing the arc at high speed. At this time, the current passing through the chopper is held in the form of a circulating current, and the circulating current being held is supplied to the load when the inverter is restarted, thereby reducing a delay in supplying DC power to the load, upon resuming the DC output from the voltage-type DC power supply. In here, the inverter may be a single-phase inverter or a multi-phase inverter, and it will be simply referred to as an inverter in the following description.

The present invention includes an aspect of the voltage-type DC power supply, and an aspect of a method of controlling the DC power supply.

[DC Power Supply]

The voltage-type DC power supply of the present invention is provided with a voltage step-down chopper constituting a DC source, and an inverter having a bridge circuit comprising four switching elements; the first switching element to the fourth switching element, configured to convert DC output from the voltage step-down chopper to single-phase AC power by operating the switching elements, a rectifier configured to subject an output from the inverter to AC-DC conversion and supply a direct current thus obtained to a load, a controller configured to control the voltage step-down chopper and the inverter, and a short-circuit section between the voltage step-down chopper and the inverter, configured to establish a short-circuit between a positive terminal and a negative terminal of the voltage step-down chopper.

In a typical power supplying operation, the voltage step-down chopper transforms a DC power voltage to a predetermined voltage, and output the DC voltage. The inverter converts the DC output from the voltage step-down chopper to single-phase AC power, by switching current paths according to operations of plural switching elements. The rectifier converts the AC power obtained by the inverter to DC power by the AC-DC conversion, and supplies thus converted DC power to the load.

In the operating state where the DC power is supplied to the load, when an arc discharge occurs in the plasma generator of the load, the load voltage drops and simultaneously excess current flows from the power source side to the load. The voltage-type DC power supply of the present invention suspends supplying power from the power source side to the load, when the arc discharge occurs, and subsequently, after extinguishing the arc, supplying of power from the power source side to the load is resumed.

When the arc discharge occurs, the controller turns off the switching elements in the inverter, turns off the switching element in the voltage step-down chopper, and turns on a short-circuit switching element in the short-circuit section, and a circulating circuit is formed by the inductor and diode in the voltage step-down chopper and the short-circuit switching element in the short-circuit section. At the time when the arc is extinguished, or after a lapse of preset time from occurrence of the arc discharge, the switching elements in the inverter are turned on, the switching element in the voltage step-down chopper is turned on, and the short-circuit switching element in the short-circuit section is turned off, thereby supplying the circulating current passing through the circulating circuit, to the inverter.

It is determined whether or not the arc is extinguished, by detecting a voltage such as a load voltage. Alternatively, a time period from occurrence of arc discharge to extinguishing of the arc is preliminary set, and the arc may be determined as being extinguished after a lapse of the preset time.

The short-circuit section of the present invention may take a form of short circuit provided between the voltage step-down chopper and the inverter, the short circuit having the switching element configured to connect and disconnect by a switching element between the positive terminal and the negative terminal of the voltage step-down chopper.

The short-circuit section of the present invention may take another form of short circuit provided between the voltage step-down chopper and the inverter, the short circuit also functioning as a boosting circuit configured to raise the DC output from the voltage step-down chopper and to supply thus raised DC output to the inverter.

The short circuit also functions as the boosting circuit is provided with a switching element connecting between the positive terminal and the negative terminal of the voltage step-down chopper, a smoothing capacitor connecting between the input ends of the inverter, and a diode connecting between the positive terminals or between the negative terminals of the smoothing capacitor and the voltage step-down chopper.

[Method of Controlling the Voltage-Type DC Power Supply]

A method of controlling a voltage-type DC power supply of the present invention is a method to control the voltage-type DC power supply provided with a voltage step-down chopper constituting a DC source, and an inverter having a bridge circuit including four switching elements; the first switching element to the fourth switching element, configured to convert DC output from the voltage step-down chopper to single-phase AC power by operating the switching elements, a rectifier configured to perform AC-DC conversion of an output from the inverter and to supply a direct current thus obtained to a load, a short-circuit section between the voltage step-down chopper and the inverter, configured to establish a short-circuit between a positive terminal and a negative terminal of the voltage step-down chopper, and a controller configured to control the voltage step-down chopper and the inverter.

The controller performs the following;

a) when an arc discharge occurs at the load, the switching elements in the inverter are turned off, the switching element in the voltage step-down chopper is turned off, and the short-circuit switching element in the short-circuit section is turned on, thereby forming a circulating circuit, by the inductor and the diode in the voltage step-down chopper and the short-circuit switching element in the short-circuit section, b) until the arc is extinguished, or until a lapse of time that is sufficient to ascertain the arc extinguishing, the current in the circulating circuit is held, and c) when the arc is extinguished or after a lapse of a predetermined time from the arc generation, the switching elements in the inverter are turned on, the switching element in the voltage step-down chopper is turned on, and the short-circuit switching element in the short-circuit section is turned off, thereby supplying the current passing through the circulating circuit, to the inverter.

Advantage of the Invention

As described above, according to the present invention, at the time of arc generation, it is possible to suppress supplying of the current from the inverter to the load side. In addition, a direct current is held, passing through the voltage-type DC power supply upon generation of the arc, and when supplying of DC output from the voltage-type DC power supply is resumed after the arc is extinguished, supplying of the DC output to the load is performed promptly by using the direct current being held.

MODE FOR CARRYING OUT THE INVENTION

The present invention relates to a voltage-type DC power supply and a control method of the voltage-type DC power supply which suspends and resumes DC output, when the DC power is supplied to a load such as a plasma generator.

In the case where DC power is supplied assuming the plasma generator as the load, when arc discharge occurs in the plasma generator being the load, supplying of the DC power from the voltage-type DC power supply to the plasma generator is suspended, thereby reducing damage on electrodes and substrates. In addition, when the arc is extinguished, supplying of DC power from the voltage-type DC power supply to the plasma generator is resumed.

In the present invention for the case of suspending and resuming DC output from the voltage-type DC power supply, the current passing through the chopper is held as circulating current upon suspension, and when the inverter is restarted, the circulating current being held is supplied to the load, thereby reducing a delay in supplying the DC power to the load, upon resuming the DC output from the voltage-type DC power supply.

Preferred embodiments of the present invention will now be described, with reference to the drawings. The voltage-type DC power supply and the control method thereof according to the present invention will be described as the following; a configuration example of the voltage-type DC power supply will be described with reference to FIG. 1 and FIG. 2, and a control example of the voltage-type DC power supply will be described with reference to FIG. 3 to FIG. 5.

[Configuration of the Voltage-Type DC Power Supply]

A voltage-type DC power supply according to the present invention is provided with a voltage step-down chopper constituting a DC source, an inverter having a bridge circuit including four switching elements, the first switching element to the fourth switching element, configured to convert DC output from the voltage step-down chopper to single-phase AC power by operating the switching elements, a rectifier configured to perform AC-DC conversion of the output from the inverter, and supplying thus obtained direct current to a load, a controller configured to control the voltage step-down chopper and the inverter, and a short-circuit section between the voltage step-down chopper and the inverter, configured to perform short-circuiting by a short-circuit switching element, between a positive terminal and a negative terminal of the voltage step-down chopper.

In a normal power supply operation, the voltage step-down chopper transforms the voltage of the DC power to a predetermined voltage, and outputs this DC voltage. The inverter switches between current paths according to the operations of the first switching element to the fourth switching element, thereby converting the DC output from the voltage step-down chopper to single-phase AC power. The rectifier converts the AC power that is converted in the inverter, to DC power by AC-DC conversion, and supplies thus converted DC power to the load.

During the operating state where the DC power is supplied to the load, when arc discharge occurs in the plasma generator being the load, load voltage drops and simultaneously excess current flows from supplying of power side to the load. The voltage-type DC power supply according to the present invention suspends power supply from the power source side to the load, when the arc discharge occurs, and after the arc is extinguished, supplying of power from the power source side to the load is resumed.

It may be decided whether there occurs an arc discharge or not, on the basis of detection of voltage such as load voltage. Alternatively, a time from occurrence of arc discharge until extinguishing the arc is preliminary set, and the extinguishing may be decided according to a lapse of this preset time.

Figure 1:
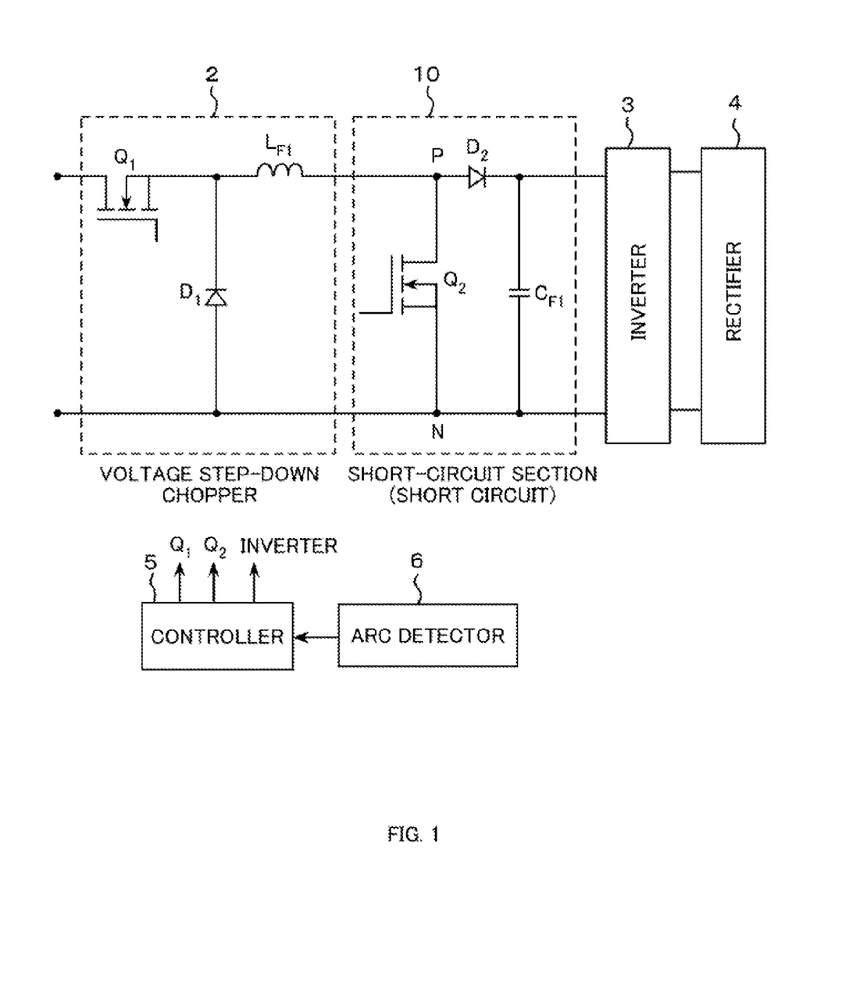
FIG. 1 is a schematic block diagram illustrating a configuration example of a voltage-type DC power supply according to the present invention.
Figure 2:
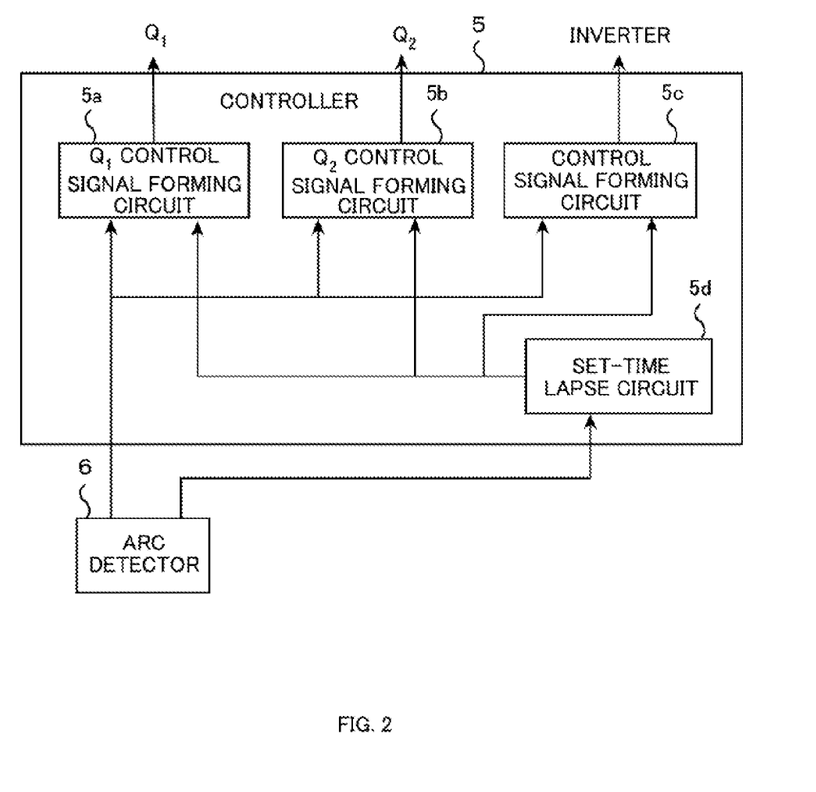
FIG. 2 is a schematic block diagram illustrating one configuration of a controller according to the present invention.

With reference to FIG. 1 and FIG. 2, a configuration example of the voltage-type DC power supply of the present invention will be described.

Figure 8:
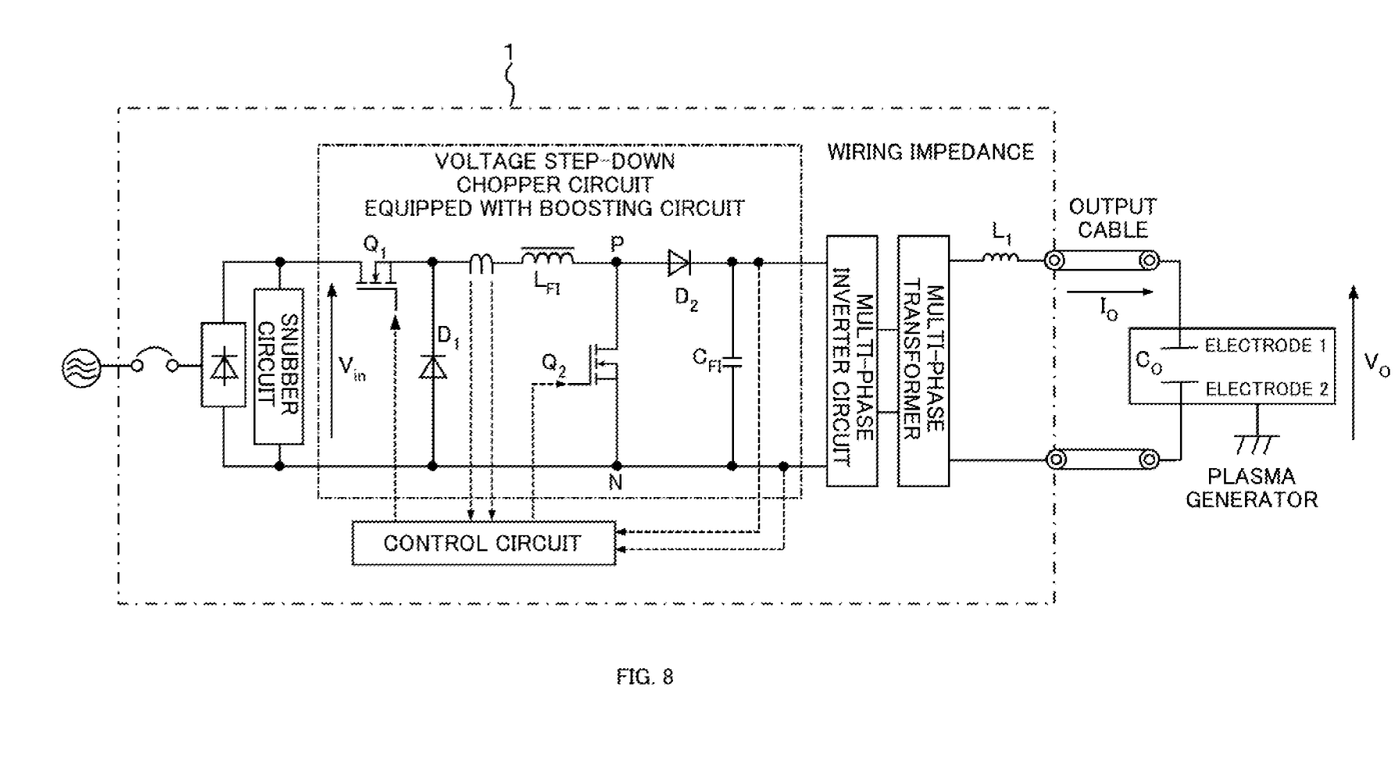
FIG. 8 illustrates a configuration example of a dual cathode power supply employing the inverter according to the present invention.

The voltage-type DC power supply 1 as shown in FIG. 1 and FIG. 8 is provided with a voltage step-down chopper 2 constituting a DC source, an inverter 3 having a bridge circuit including four switching elements; the first switching element to the fourth switching element, configured to convert DC output from the voltage step-down chopper 2 to single-phase AC power according to the operation of the switching elements, an rectifier 4 configured to perform AC-DC conversion of the output from the inverter 3, and to supply a direct current thus obtained to a load, a controller 5 configured to control the voltage step-down chopper 2 and the inverter 3, and a short-circuit section 10 between the voltage step-down chopper 2 and the inverter 3, configured to perform short-circuiting by a short-circuit switching element $Q_2$ between a positive terminal P and a negative terminal N of the voltage step-down chopper. This short-circuit section 10 also operates as a boosting circuit.

The voltage step-down chopper 2 is provided with a switching element $Q_1$, a diode $D_1$, and a DC reactor $L_{F1}$. The voltage of the switching element $Q_1$ drops by the chopper control on the DC voltage. The DC reactor $L_{F1}$ performs current smoothing on the direct current after the chopper control is applied. Switching elements such as IGBT and MOSFET may be employed as the diode $D_1$.

The inverter 3 inputs the direct current after subjected to the current smoothing in the voltage step-down chopper 2, and then performs DC-AC conversion by controlling the switching elements in the bridge circuit provided in the inverter 3.

The short-circuit section 10 has a configuration that a short-circuit switching element $Q_2$ is connected between the positive terminal P and the negative terminal N of the voltage step-down chopper 2. In the off-state of the switching element $Q_1$, when a short-circuit is established between the positive terminal P and the negative terminal N, the DC voltage charged in the capacitor $C_{F1}$ is blocked by the diode $D_2$, and then a closed circuit is formed together with the diode $D_1$ and the DC reactor $L_{F1}$ of the voltage step-down chopper 2.

The diode $D_2$ is a blocking diode that blocks application of the DC voltage charged in the capacitor $C_{F1}$ to the switching element $Q_2$ when the switching element $Q_2$ is in the on-state, and the diode $D_2$ may be connected to the negative terminal N side, instead of being connected to the positive terminal P side as shown in FIG. 1.

The capacitor $C_{F1}$ accumulates energy of the current passing through the DC reactor $L_{F1}$ in the voltage step-down chopper 2. In addition, the capacitor absorbs surge voltage generated during a commutation operation performed between the switching elements in the inverter 3, and energy of the inductor connected in series with each of the switching elements, thereby producing an action for protecting the switching elements.

The inverter 3 is configured by bridge connection of the switching elements; the first switching element to the fourth switching element. For the switching element, a solid-state switching element, such as IGBT and MOSFET, may be employed. Each of the switching elements in the inverter performs switching operation on the basis of a control signal from the controller 5, converts the DC power to AC power to and outputs the AC power.

The rectifier 4 rectifies the AC output from the inverter 3, and supplies the load with DC output. In order to remove a high-frequency ripple component included in the AC output from the inverter, the output end of the rectifier 4 may be configured in such a manner as having a DC filter circuit. The DC filter circuit may be configured, using one of or both of an output capacitor (not illustrated) and an output reactor (not illustrated), the output capacitor being connected in parallel with the output end and the output reactor being connected in series therewith.

The DC output from the rectifier 4 is supplied to the plasma generator via an output cable that connects between the voltage-type DC power supply 1 and the plasma generator.

The voltage-type DC power supply 1 may utilize parasitic impedance, instead of the DC filter circuit connected to the rectifier 4, as a configuration to remove the high-frequency ripple component. By way of example, as an inductance component, it is possible to employ a wiring inductance between the rectifier 4 and the output terminal, an inductance or a capacitor included in the output cable connecting between the voltage-type DC power supply 1 and the load. If a plasma load is used, an electrode capacitance of the plasma generator may be employed as the inductance component. The aforementioned parasitic impedance of the inverter, and a capacitive component of the output cable and electrode capacitance, substantially constitute the DC filter circuit, causing a reduction of the high-frequency ripple component included in the AC output from the inverter.

In addition, the ripple component of the DC voltage possesses a property to increase, when a drive frequency of the inverter circuit is lowered. Therefore, increase of the drive frequency of the inverter circuit may reduce the necessity of the output capacitor and the output reactor. In addition, increase of the drive frequency of the inverter circuit may suppress the energy that is held by the voltage-type DC power supply 1 internally.

The voltage-type DC power supply 1 according to the present invention is further provided with a controller 5 that controls the voltage step-down chopper 2, the short-circuit section 10, and the inverter 3. With reference to the schematic block diagram of FIG. 2, one configuration example of the controller 5 will be described.

The controller 5 is provided with a control signal forming circuit 5a configured to form a control signal to perform ON/OFF control of the switching element $Q_1$ in the voltage step-down chopper 2, a control signal forming circuit 5b configured to form a control signal to perform ON/OFF control of the switching element $Q_2$ that is provided between the positive terminal and the negative terminal in the short-circuit section 10, and a control signal forming circuit 5c configured to form a pulse control signal to perform ON/OFF control of the switching elements in the inverter 3.

The control signal forming circuit 5a is a circuit to perform chopper control on the switching element $Q_1$ in the voltage step-down chopper 2, so as to detect chopper current being an output from the switching element $Q_1$, and output voltage and output current from the voltage-type DC power supply 1, and then, exerts control so that the output from the voltage-type DC power supply 1 becomes a predetermined current value and a predetermined voltage value, on the basis of the detection values of those chopper current, output voltage, and output current. In addition, according to an arc detection signal of an arc detector 6, the switching element $Q_1$ is turned off when an arc is generated, and switched from the off-state to the on-state, when the arc is extinguished.

The control signal forming circuit 5b is a circuit to perform ON/OFF control of the short-circuit switching element $Q_2$ of the short-circuit section 10, and it is switched to the on-state, when an arc is generated, and it is switched from the on-state to the off-state when the arc is extinguished, on the basis of the arc detection signal of the arc detector 6.

According to the operations of the switching element $Q_1$ and the short-circuit switching element $Q_2$, a closed circuit is formed together with the diode $D_1$ and the DC reactor $L_{F1}$ in the voltage step-down chopper 2, and the energy accumulated in the DC reactor $L_{F1}$ circulates in the closed circuit in the form of circulating current $\Delta i$.

The control signal forming circuit 5c forms a pulse control signal to perform ON/OFF control of the switching elements in the inverter 3, and the inverter 3 that controls the switching operations of the switching element $Q_U$, $Q_V$, $Q_X$, and $Q_Y$ of the respective arms constituting the bridge circuit of the inverter 3, performs DC-AC conversion to convert inputted direct current to alternate current, according to the control of the switching elements. In addition, on the basis of the arc detection signal of the arc detector 6, the switching elements are turned off, when an arc is generated, and turned on from the off-state when the arc is extinguished.

The controller 5 may further be provided with a set-time lapse circuit 5d in addition to the aforementioned control signal forming circuits 5a to 5c. The set-time lapse circuit 5d is a circuit to form a control signal for the time when the arc is extinguished. A set time is determined in advance, which is long enough as a period from generation to extinguishing of arc, and a control signal is outputted at the point when the set time has elapsed from inputting the arc detection signal from the arc detector 6, causing the control signal forming circuit 5a to output a control signal to turn on the switching element $Q_1$ from the off-state, causing the control signal forming circuit 5b to output a control signal to turn off the short-circuit switching element $Q_2$ from the on-state, and causing the control signal forming circuit 5c to output a control signal to turn on the switching element of the inverter 3 from the off-state.

The set-time lapse circuit 5d clocks the time elapsed from the detection of arc discharge, and after a lapse of the predetermined set-time $t_{arc}$, it is determined that the arc is extinguished, and then a control signal is outputted. The set-time $t_{arc}$ corresponds to the time to hold the current state where the DC current immediately before the occurrence of arc discharge passes in the form of circulating current $\Delta i$. Any length of set-time $t_{arc}$ can be set as the holding time. By way of example, a time necessary as the period from occurrence of the arc discharge to extinguishing of the arc is obtained in advance as to the load being a control target, and a marginal component being estimated on the basis of a fluctuation range, may be added to the predetermined time period, or the like, thereby determining the set-time $t_{arc}$.

The arc detector 6 may detect the state of arc discharge occurrence in the arc generator of the load, for example, on the basis of the voltage at the load or at the output end.

Detection of the arc state according to the arc detector 6 is performed as the following; for example, in the state of passing the load current, a voltage value at the load, or a voltage value at the output end of the voltage-type DC power supply 1 is compared with a first threshold being predetermined, and when the detected voltage becomes lower than the first threshold, it is detected that the arc discharge has occurred. In addition, after detecting the occurrence of arc discharge, the detected voltage is compared with a second threshold being predetermined, and when the detection voltage exceeds the second threshold, it is determined that arc is extinguished.

Figure 6:
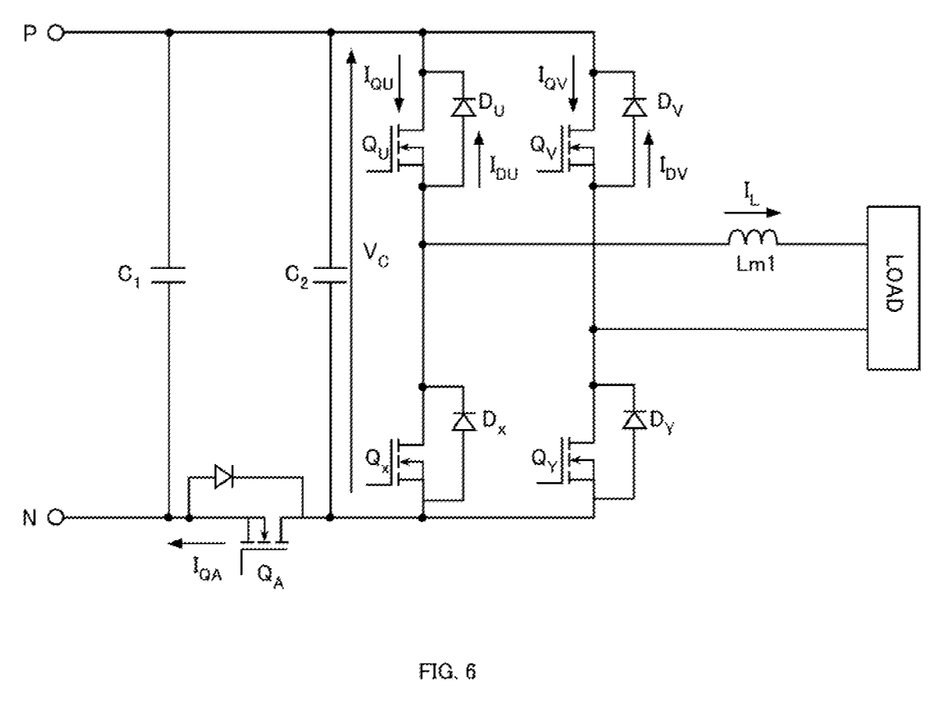
FIG. 6 illustrates a configuration example of an inverter.

As shown in FIG. 6, the bridge circuit having four arms constitutes the inverter 3, for instance. The arms are equipped with four switching elements $Q_U$, $Q_V$, $Q_X$, and $Q_Y$, respectively. The switching element $Q_U$ and the switching element $Q_X$ are connected in series, and the switching element $Q_V$ and the switching element $Q_Y$ are connected in series.

The connection point between the switching element $Q_u$ and the switching element $Q_x$ is connected to the positive terminal side of the load via the reactor $L_{m1}$, and the connection point between the switching element $Q_v$ and the switching element $Q_y$ is connected to the negative terminal side of the load.

The controller 5 receives a feedback signal from the output end of the voltage-type DC power supply 1 or from the load side. The feedback signal may have the same voltage, current, or power as those at the output end of the voltage-type DC power supply 1.

[Control Operation of DC Power Supply]

The controller of the voltage-type DC power supply according to the present invention, performs following control A to control C, and control D respectively, at the time of suspending DC power from the voltage-type DC power supply, during the suspension thereof, and at the time of resuming thereof. Further according to the control A to control D, for the time of suspending and resuming the DC power from the voltage-type DC power supply, the current passing through the chopper at the time of suspension is held in the form of circulating current, and this circulating current is supplied to the load upon restarting the inverter, thereby reducing a delay of supplying the DC power to the load, when the DC output from the voltage-type DC power supply is resumed.

The controller of the voltage-type DC power supply according to the present invention performs the following control at the time of suspending, during the suspension, and at the time of resuming DC output from the voltage-type DC power supply 1.

Control A: At the Time of Suspending of DC Output from the Voltage-Type DC Power Supply when an Arc is Generated (Stop Operation of the Voltage Step-Down Chopper)

Control when DC output from the power supply is suspended includes turning off the voltage step-down chopper from the on-state, and the short-circuit section establishes a short-circuit between the positive terminal and the negative terminal. Accordingly, the inverter is turned off from the on-state.

At the time when supplying of power from the power source side to the load is suspended upon occurrence of arc discharge, the operation of the voltage step-down chopper is stopped, simultaneously establishing a short-circuit between the positive terminal side and the negative terminal side in the short-circuit section, thereby stopping the current passage from the inverter to a transformer side.

In the voltage-type DC power supply 1, in the state where DC output is supplied to the load, the voltage step-down chopper transforms the DC power from the DC source, to a predetermined voltage and inputs the voltage to the inverter. The inverter converts the DC power to AC power. The rectifier performs AC-DC conversion of the output from the inverter, and supplies the DC power to the load.

At the time when DC output from the voltage-type DC power supply 1 is suspended, the voltage step-down chopper is turned off from the on-state, and supplying of power from the DC source is stopped. At this time of suspension, when the short-circuit section establishes a short-circuit between the positive terminal and the negative terminal, a closed circuit is formed between the voltage step-down chopper and the short-circuit section. Energy accumulated at the time of suspension, in the inductor of the voltage step-down chopper, passes through the closed circuit in the form of circulating current. When the inverter is restarted and DC output is resumed, this circulating current passes into a circuit closer to the load, relative to the voltage step-down chopper, at a time point ahead of supplying DC output from the DC source, thereby allows to supply power promptly from the inverter to the load.

Control B: During Suspension of DC Output from the Voltage-Type DC Power Supply 1 (Operation of Forming Circulating Circuit and Operation of Holding Circulating Current)

Control during the suspension of the DC output from the voltage-type DC power supply 1 holds the off-state of the inverter switch, the off-state of the voltage step-down chopper switch, and the short-circuited state between the positive terminal and the negative terminal of the short-circuit section.

During the suspension of supplying of power from the power source side to the load, the circulating circuit including the inductor of the voltage step-down chopper is formed, and the current passing through the inductor is held in the form of circulating current.

During the suspension of the DC output from the voltage-type DC power supply 1, by holding the off-state of the voltage step-down chopper switch, suspension of supplying of power from the DC source is held, and holding the short-circuited state between the positive terminal and the negative terminal of the short-circuit section, allows the circulating current to be held, passing through the circulating circuit that is formed between the voltage step-down chopper and the short-circuit section.

Control C: At the Time of Resuming DC Output from the Voltage-Type DC Power Supply 1 (Operation of Restarting the Inverter, Using the Circulating Current)

Control upon resuming DC output from the voltage-type DC power supply 1 turns on the voltage step-down chopper from the off-state, allowing the short-circuit section to be in the open state, and turns on the inverter from the off-state.

When the DC output from the voltage-type DC power supply 1 is resumed, the inverter is turned on from the off-state, the voltage step-down chopper is turned on from the off-state, and by opening the short-circuit section, transforming the DC power of the DC source to a predetermined voltage is resumed, and thus transformed DC power is inputted in the inverter.

After the arc is extinguished, the circulating current is allowed to pass through the inverter when resuming to supply power, thereby restarting the inverter promptly.

Control D: Short-Circuit Control

The controller performs short-circuit control between the positive terminal and the negative terminal of the short-circuit section, when DC output from the voltage-type DC power supply is stopped and during suspension thereof. In this short-circuit control, the switching element constituting the short-circuit section is turned on, thereby establishing a short-circuit between the positive terminal and the negative terminal, and turning off the switching element opens between the positive terminal and the negative terminal.

Supplying of power to the load is stopped at the time of arc discharge, by the function of suspending the voltage step-down chopper, the short-circuit operation by the short-circuit section, and the function of suspending the inverter according to the control A. Then, the inverter is restarted promptly by the operation of holding the circulating current in the voltage step-down chopper according to the control B, and by using the circulating current according to the control C.

In the voltage-type DC power supply 1 according to the present invention, when arc discharge occurs, the controller is able to perform control for suspending and restarting DC output, on the basis of a detection signal detected by the arc detector that detects the arcing state. The controller performs suspending control on the basis of detection of arc discharge occurrence, and performs restarting control on the basis of detection of arc extinguishing.

The arc detector detects a voltage at the load, or a voltage at the output end of the voltage-type DC power supply, compares the detected voltage with a predetermined first threshold, and detects arc generation when the detected voltage is lower than the first threshold.

After detecting the arc generation, the detected voltage is compared with a predetermined second threshold, and when the detected voltage exceeds the second threshold, it is determined that arc is extinguished.

[Operation Example of the Voltage-Type DC Power Supply]

Figure 3:
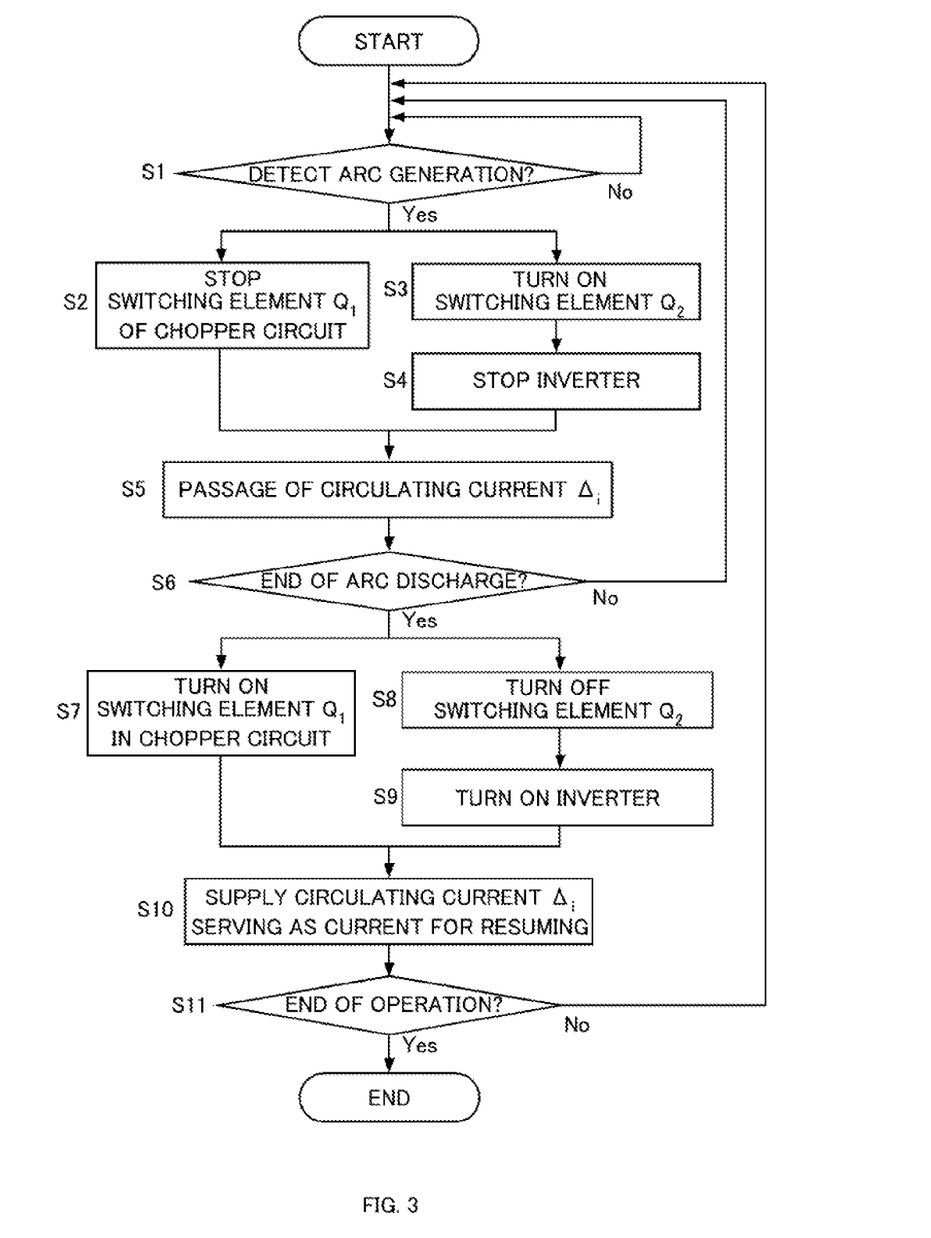
FIG. 3 is a flowchart illustrating an operation example of the voltage-type DC power supply according to the present invention.

Next, an operation example of the voltage-type DC power supply 1 according to the present invention will be described, with reference to FIG. 3 to FIG. 5. FIG. 3 is a flowchart to explain the operation example of the voltage-type DC power supply 1 according to the present invention, FIG. 4 is a timing chart to explain the operation example of the voltage-type DC power supply according to the present invention, and FIG. 5 illustrates a flow of current in the voltage-type DC power supply 1 according to the present invention, at the time of occurrence of arc discharge and extinguishing thereof.

The flowchart as shown in FIG. 3 shows an operation example (S1 to S6) when the arc discharge occurs, and an operation example (S7 to S11) when the arc is extinguished, in the state of normal operation of the voltage-type DC power supply 1.

In the state where the voltage-type DC power supply 1 supplies DC power to the load, when arc discharge occurs in the arc generator, input voltage to the load or output voltage from the voltage-type DC power supply is lowered.

The arc detector 6 detects and monitors the voltage and current at the load or at the output end of the voltage-type DC power supply 1, and when the voltage drops while the load current is passing, it is detected that arc discharge has occurred. Occurrence of arc discharge can be detected by comparing the detected value with a predetermined threshold. It should be noted that comparison between the detected voltage value and the threshold is not the only way for detecting the arc discharge (S1).

(Operation Example when Arc Discharge Occurs)

When occurrence of arc discharge is detected, the switching element $Q_1$ in the voltage step-down chopper 2 is stopped (S2), ON signal for short-circuiting formed by the control signal forming circuit for short-circuiting 5 (S3), turns on the short-circuit switching element $Q_2$ in the short-circuit section 10, and establishes a short-circuit between the positive terminal P and the negative terminal N of the voltage step-down chopper 2. This short-circuit operation suspends supplying of power by the inverter 3, and simultaneously stops (turns off) the inverter 3 (S4).

According to the steps from S2 to S4, supplying of power from the DC power source to the voltage step-down chopper 2 is stopped, suspending the DC power supplied to the load from the voltage-type DC power supply 1, and a closed circuit is formed by the diode $D_1$ and the DC reactor $L_{F1}$ of the voltage step-down chopper 2. Current passing through the inductance of the DC reactor $L_{F1}$ of the voltage step-down chopper 2 circulates through the closed circuit thus established, in the form of circulating current $\Delta i$ (S5).

The circulating current $\Delta i$ is supplied to the inverter 3, when supplying of DC power is resumed from the voltage-type DC power supply 1 to the load, and this may accelerate starting of DC-AC conversion by the inverter 3.

(Operation Example when Arc is Extinguished)

When occurrence of arc discharge is detected followed by detecting the arc extinguishing, or after a lapse of time assumed to be required for extinguishing the arc (S6), the switching element $Q_1$ of the voltage step-down chopper 2 is turned on from the off-state (S7), and outputting of the control signal for short-circuiting is terminated, thereby turning off the short-circuit switching element $Q_2$ (S8) and the short-circuit state between the positive terminal P and the negative terminal N of the voltage step-down chopper 2 is terminated to cause conduction, thereby allowing the inverter 3 to be in the operating state (S9).

According to the steps from S7 to S9, supplying of power from the DC source to the voltage step-down chopper 2 is resumed, and the circulating current $\Delta i$ passing through the closed circuit formed by the diode $D_1$ and the DC reactor $L_{F1}$ of the voltage step-down chopper 2 is supplied to the bridge circuit of the inverter 3, ahead of supplying power from the voltage step-down chopper 2 (S10).

According to the step of S7, when the conduction of the voltage step-down chopper 2 is resumed, an inductance component and a floating capacitance component held by the voltage step-down chopper may cause a delay of DC current that is supplied from the DC source to the inverter 3 via the voltage step-down chopper 2. On the other hand, when the short-circuiting between the positive terminal P and the negative terminal N of the voltage step-down chopper 2 is stopped, and a current path is formed between the voltage step-down chopper 2 and the inverter 3, thereby causing the circulating current di to be supplied to the inverter 3 ahead of the DC supply from the DC source, and this may accelerate supplying of power to the load.

The steps from S1 to S10 are repeated until the end of the operation of the voltage-type DC power supply 1 (S11).

The timing chart as shown in FIG. 4 illustrates an operation example of the voltage-type DC power supply 1 according to the present invention, and FIG. 4A to FIG. 4D respectively shows; the detection of arc generation, detection of arc extinguishing, set lapse time for arcing, and arc detection signal, according to the arc detector. FIG. 4E shows the operating state of the switching element $Q_1$ in the voltage step-down chopper and the inverter 3, FIG. 4F shows the operating state of the voltage step-down chopper, FIG. 4G shows the operating state of the short-circuit switching element $Q_2$ in the short-circuit section, and FIG. 4H shows the output voltage ($V_o$) from the voltage-type DC power supply.

Since usually known gate signals can be employed as gate signals for driving the switching elements $Q_U$ and $Q_V$ of the arms on the positive terminal side of the inverter, and for driving the switching elements $Q_X$ and $Q_Y$ of the arms on the negative terminal side thereof, those signals are not illustrated here.

Upon detecting arc generation (FIG. 4A), the arc detector 6 raises an arc detection signal (FIG. 4D), and upon detecting arc extinguishing (FIG. 4B), the arc detector causes the arc detection signal to fall. It is further possible to configure such as causing the arc detection signal to fall on the basis of a lapse of a set lapse time for arcing, from the detection of arc generation (FIG. 4C), instead of the detection of arc extinguishing.

Figure 4A:
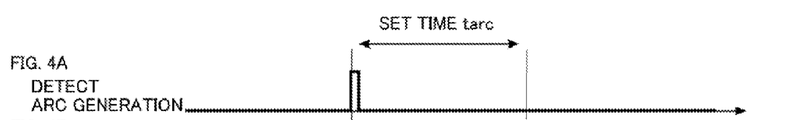
FIG. 4 is a timing chart illustrating the operation example of the voltage-type DC power supply according to the present invention.
Figure 4B:
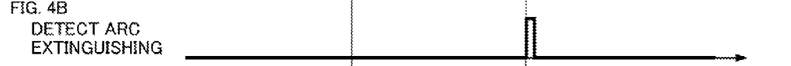
Figure 4C:
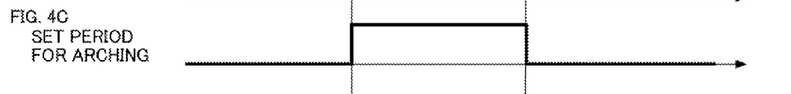
Figure 4D:
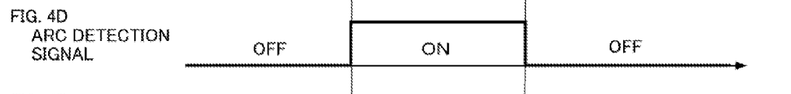
Figure 4E:
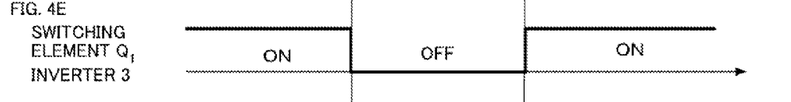
Figure 4F:
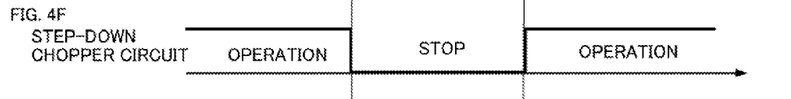
Figure 4G:
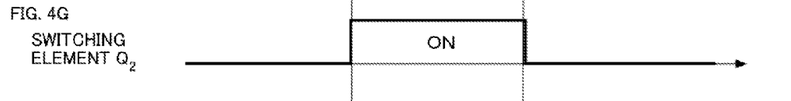
Figure 4H:
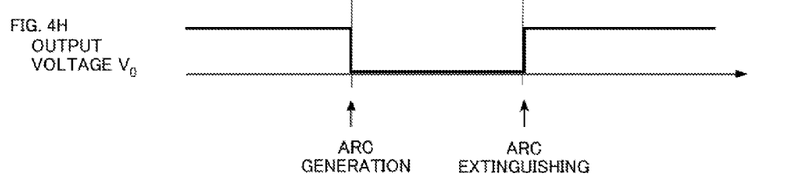

In the state where DC power is supplied from the DC source to the load, the inverter 3 is in the on-state, and by suspending the operation of the inverter 3, the output voltage $V_o$ becomes zero (FIG. 4H). In addition, the switching element $Q_1$ of the voltage step-down chopper 2 is in the on-state, and the short-circuit switching element $Q_2$ of the short-circuit section 10 is in the off-state. In this power supplying state, when an arc detection signal is raised (FIG. 4D), the controller 5 turns off the inverter and also turns off the switching element $Q_1$ (FIG. 4E), thereby stops supplying of power from the DC source (FIG. 4H), simultaneously turns on the short-circuit switching element $Q_2$ (FIG. 4G), and forms a circulating circuit by the closed circuit of the diode $D_1$ and the DC reactor $L_{F1}$ of the voltage step-down chopper 2.

The arc detector 6 causes the arc detection signal to fall (FIG. 4D), at the time of detecting arc extinguishing (FIG. 4B) or after a lapse of the set lapse time for arcing, from detecting the arc generation (FIG. 4C).

After the fall of the arc detection signal (FIG. 4D), the controller 5 turns on the inverter 3 from the off-state, and turns on the switching element $Q_1$ from the off-state (FIG. 4E). Along with resuming supplying of power from the DC source (FIG. 4H), the short-circuit switching element $Q_2$ is turned off from the on-state (FIG. 4G), allowing the circulating current $\Delta i$ passing through the circulating circuit to flow toward the inverter side. According to restarting of the operation of the inverter 3, the output voltage $V_o$ is outputted (FIG. 4H).

In the case where the set lapse time for arcing determines a period when the short-circuit switching element $Q_2$ is turned on with passing the circulating current through the circulating circuit, this set lapse time for arcing may be any value as an interval (set-time $t_{arc}$) to hold the state when the arc discharge occurs, which is the period from the arc discharge occurrence until the point when the arc is determined to be extinguished.

FIG. 5 illustrates a circuit state of the voltage-type DC power supply according to the present invention. FIG. 5 illustrates the circuit state for the case where the short-circuit section employs a circuit that is provided with a boosting function. As for the diodes $D_1$ and $D_2$ shown in FIG. 5, the diode with a symbol in the form of outlined triangle indicates that no current passes therethrough, and the diode with a symbol in the form of black triangle indicates that current passes therethrough.

Figure 5A:
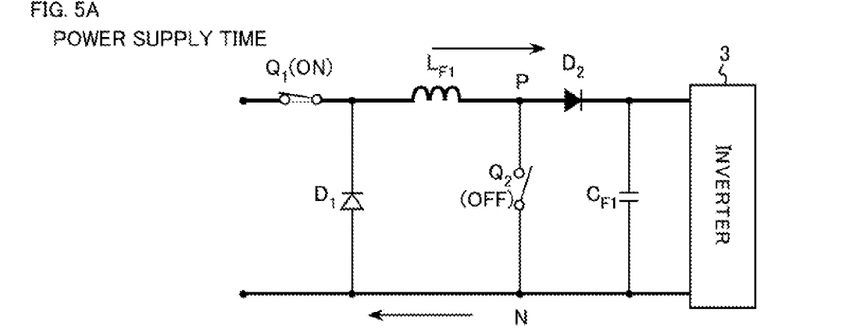
FIG. 5 illustrates a flow of current at the time of arc discharge and extinguishing in the voltage-type DC power supply according to the present invention.

FIG. 5A illustrates the state that power is supplied from the DC source to the inverter 3 side. When power is supplied, the switching element $Q_1$ is in the on-state, and the short-circuit switching element $Q_2$ being the boosting circuit is in the off-state. The power is supplied from the DC source to the inverter side, via the voltage step-down chopper.

Figure 5B:
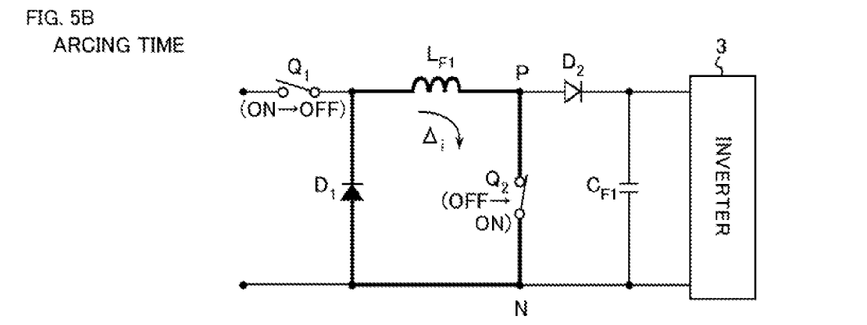

FIG. 5B illustrates the state where an arc is generated. When an arc is generated, the switching element $Q_1$ is turned off from the on-state, the short-circuit switching element $Q_2$ is turned on from the off-state, and a circulating circuit is formed on the basis of the closed circuit including the diode $D_1$ and the DC reactor $L_{F1}$ of the voltage step-down chopper 2. Circulating current $\Delta i$ passes through the circulating circuit.

Figure 5C:
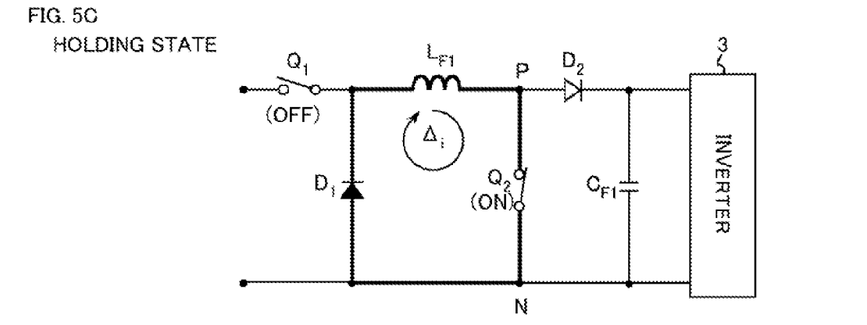

FIG. 5C illustrates a holding state. In the holding state, the switching element $Q_1$ is held in the off-state and the short-circuit switching element $Q_2$ of the boosting circuit is held in the on-state, thereby suspending the power toward the load, waiting until the arc is extinguished. During this period, the circulating current $\Delta i$ is kept passing through the circulating circuit.

Figure 5D:
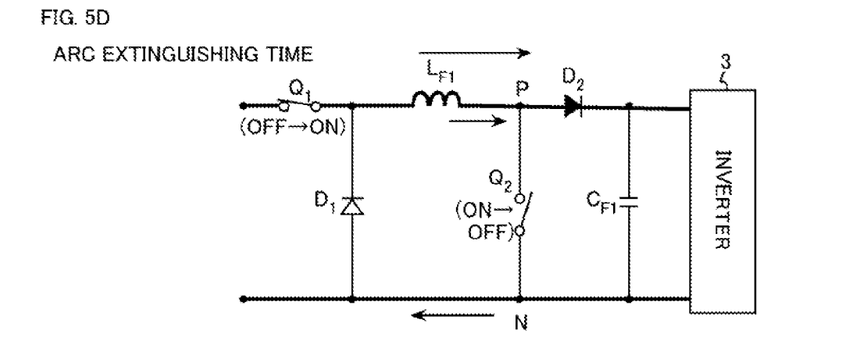

FIG. 5D indicates the state where the arc is extinguished. When the arc is extinguished, the switching element $Q_1$ is turned on from the off-state, the short-circuit switching element $Q_2$ of the boosting circuit is turned off from the on-state. Then, the circulating current $\Delta i$ passing through the circulating circuit is allowed to flow toward the load side, and simultaneously, power supplying from the DC source to the inverter side is resumed, via the step-down type chopper.

[Configuration Example of the Power Supply Using the Inverter]

Figure 7:
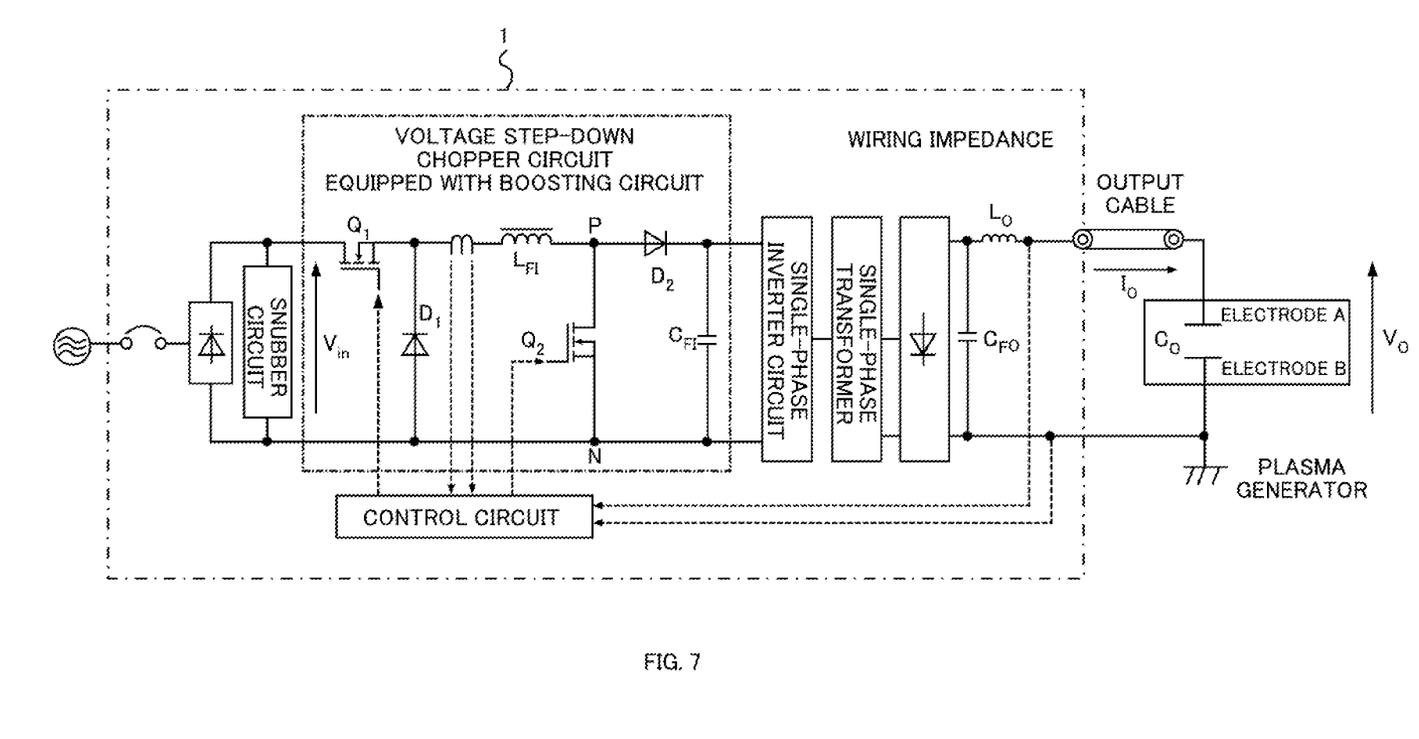
FIG. 7 illustrates a configuration example of a DC power supply that employs the inverter according to the present invention.

FIG. 7 illustrates a configuration example of the voltage-type DC power supply 1 using the inverter according to the present invention. The voltage-type DC power supply 1 is a power source to supply high-frequency power to a load of a plasma generator, and the plasma generator is provided with two electrodes; an electrode to input DC voltage from the voltage-type DC power supply 1, and an electrode being grounded. According to this voltage-type DC power supply 1, one electrode can be grounded, while applying DC voltage to the other electrode.

The voltage-type DC power supply 1 is provided with a rectifier to rectify AC power from an AC source, a snubber configuring a protection circuit to suppress high voltage transiently generated, a voltage step-down chopper configured to transform a voltage of DC power inputted from the rectifier to a predetermined voltage and to output DC current, a single-phase inverter configured to convert the DC output from the voltage step-down chopper to an AC output, a single-phase transformer configured to transform the AC output from the single-phase inverter to a predetermined voltage, and a rectifier configured to rectify the AC output from the single-phase transformer. The voltage-type DC power supply supplies the output from the rectifier to the electrode A, via an output cable.

(Configuration Example of a Dual Cathode Power Supply)

FIG. 8 illustrates a configuration example of the dual-cathode power supply using the voltage-type DC power supply 1 according to the present invention, a multi-phase inverter and a multi-phase transformer.

The dual-cathode power supply is a power source that supplies high-frequency power to a load of a plasma generator, and the plasma generator is provided with two electrodes; the electrode 1 and the electrode 2 within a case connected to ground. This dual cathode power supply allows AC voltage, being electrically symmetric, to be applied to the two electrodes.

The dual cathode power supply is provided with a rectifier configured to rectify AC power from an AC power source, a snubber that forms a protection circuit configured to suppress high voltage generated transiently, a voltage step-down chopper configured to convert DC power voltage being inputted from the rectifier, to predetermined voltage and output the DC current, a multi-phase inverter configured to convert the DC output from the voltage step-down chopper to a multi-phase AC output, and a multi-phase transformer configured to convert the AC output from the multi-phase inverter to predetermined voltage. Here, output from the multi-phase transformer has a single-phase configuration.

The dual-cathode power supply supplies one output from the multi-phase transformer to the electrode 1 via an output cable, and supplies the other output to the other electrode 2 via the output cable.

It should be noted that the preferred embodiments and modifications in the preceding description are intended to illustrate an example of the voltage-type DC Dower supply and the control method of the voltage-type DC power supply according to the present invention, and it should be understood that the invention embrace all modifications and variations of the exemplary embodiments, rather than limiting, and they fall with the spirit and scope of the present invention.

INDUSTRIAL APPLICABILITY

The voltage-type DC power supply of the present invention can be applied as a power source to supply power to a plasma generator.

DESCRIPTION OF SYMBOLS 1 voltage-type DC power supply
2 voltage step-down chopper
3 inverter
4 rectifier
5 controller
5a control signal forming circuit
5b control signal forming circuit
5c control signal forming circuit
5d set-time lapse detection circuit
6 arc detector
10 short-circuit section
$C_{F1}$ capacitor
$D_1$ diode
$D_2$ diode
$L_{F1}$ DC reactor
$L_{m1}$ inductance
N negative terminal
P positive terminal
$Q_1$ switching element
$Q_2$ short-circuit switching element
$Q_U$ switching element
$Q_V$ switching element
$Q_X$ switching element
$Q_Y$ switching element
$t_{arc}$ set time
Vo output voltage
Δi circulating current

What is claimed is:

1. A DC voltage power supply comprising, a voltage step-down chopper constituting a DC source,
   an inverter having a bridge circuit including four switching elements; a first switching element to a fourth switching element, being configured to convert DC output from the voltage step-down chopper in single-phase AC power by operating the switching elements,
   a rectifier configured to perform AC-DC conversion of an output from the inverter, and to supply a direct current thus obtained to a load, and
   a controller configured to control the voltage step-down chopper and the inverter, and the voltage-type DC power supply further comprising,
   a short-circuit section between the voltage step-down chopper and the inverter, configured to establish a solidly connected short-circuit between a positive terminal and a negative terminal of the voltage step-down chopper, wherein,
   when the arc discharge occurs, the controller turns off the first to the fourth switching elements in the inverter, turns off the switching element ($Q_1$) in the voltage step-down chopper, turns on a short-circuit switching element ($Q_2$) in the short-circuit section, and forms a circulating circuit by the inductor ($L_F$) and diode ($D_1$) in the voltage step-down chopper and the short-circuit switching element ($Q_2$) in the short-circuit section, and
   when the arc is extinguished, or after a lapse of a preset time from occurrence of the arc discharge, the controller turns on the first to the fourth switching elements in the inverter, turns on the switching element ($Q_1$) in the voltage step-down chopper, and turns off the short-circuit switching element ($Q_2$) in the short-circuit section, thereby supplying the circulating current passing through the circulating circuit, to the inverter.

2. The DC voltage power supply according to claim 1, further comprising a short circuit between the voltage step-down chopper and the inverter, the short circuit having a switching element configured to connect and disconnect between the positive terminal and the negative terminal of the voltage step-down chopper, wherein,
   the short-circuit switching element of the short-circuit section serves as the switching element in the short circuit.

3. The DC voltage power supply according to claim 2, wherein,
   the short circuit comprises the short-circuit switching element ($Q_2$) connecting between the positive terminal and the negative terminal of the voltage step-down chopper, a smoothing capacitor ($C_F$) connecting between input terminals of the inverter, and a diode ($D_2$) connecting between the positive terminals or between the negative terminals of the smoothing capacitor ($C_F$), thereby configuring a boosting circuit.

4. A method of controlling a DC power supply comprising,
   a voltage step-down chopper constituting a DC source,
   an inverter having a bridge circuit comprising four switching elements; a first switching element to a fourth switching element, being configured to convert DC output from the voltage step-down chopper to single-phase AC power by operating the switching elements,
   a rectifier configured to perform AC-DC conversion of an output from the inverter, and to supply a direct current thus obtained to a load,
   a short-circuit section between the voltage step-down chopper and the inverter, configured to establish a solidly connected short-circuit by a short-circuit switching element between a positive terminal and a negative terminal of the voltage step-down chopper, and
   a controller configured to control the voltage step-down chopper and the inverter, wherein,
   when the arc discharge occurs, the controller turns off the first to the fourth switching elements in the inverter, turns off the switching element ($Q_1$) in the voltage step-down chopper, turns on the short-circuit switching element ($Q_2$) in the short-circuit section, and forms a circulating circuit by the inductor ($L_F$) and diode ($D_1$) in the voltage step-down chopper and the short-circuit switching element ($Q_2$) in the short-circuit section,
   during a period until the arc is extinguished or until a preset time has elapsed from occurrence of the arc discharge, the controller holds circulating current passing through the circulating circuit, and
   when the arc is extinguished or after a lapse of the preset time from the occurrence of the arc discharge, the controller turns on the first to the fourth switching elements in the inverter, turns on the switching element ($Q_1$) in the voltage step-down chopper, and turns off the short-circuit switching element ($Q_2$) in the short-circuit section, thereby supplying the circulating current passing through the circulating circuit, to the inverter.

\* \* \* \* \*